United States Patent [19]
Abe

[11] Patent Number: 5,936,775
[45] Date of Patent: Aug. 10, 1999

[54] REAL-IMAGE TYPE OPTICAL FINDER

[75] Inventor: Tetsuya Abe, Hokkaido, Japan

[73] Assignee: Asahi Kogaku Kogyo Kabushiki Kaisha, Tokyo, Japan

[21] Appl. No.: 09/095,019

[22] Filed: Jun. 10, 1998

[30] Foreign Application Priority Data

Jun. 17, 1997 [JP] Japan ................................. 9-159931

[51] Int. Cl.⁶ ........................................... G02B 25/00
[52] U.S. Cl. ........................................ 359/645; 396/382
[58] Field of Search .................................. 359/643, 644,
359/645, 646, 647; 396/382

[56] References Cited

U.S. PATENT DOCUMENTS

| | | | |
|---|---|---|---|
| 4,964,686 | 10/1990 | Kato | 359/423 |
| 5,055,868 | 10/1991 | Itoh et al. | 359/676 |
| 5,182,672 | 1/1993 | Mukai et al. | 359/652 |
| 5,434,636 | 7/1995 | Hasushita et al. | 359/432 |
| 5,495,367 | 2/1996 | Morooka | 359/674 |
| 5,749,008 | 5/1998 | Ishihara et al. | 396/373 |

FOREIGN PATENT DOCUMENTS

| | | |
|---|---|---|
| 55-130527 | 10/1980 | Japan. |
| 2214805 | 8/1990 | Japan. |
| 6300970 | 10/1994 | Japan. |

*Primary Examiner*—Scott J. Sugarman
*Attorney, Agent, or Firm*—Greenblum & Bernstein P.L.C.

[57] ABSTRACT

In a real-image type optical finder, a positive first lens group (objective lens group), a positive second lens group (relay lens group and image erecting optical system), and a positive third lens group (eyepiece lens group), are included in that order from the object side. The optical system satisfies the following condition (1):

$$5.0 < L/f_{II} < 7.0; \qquad (1)$$

wherein:

L represents the distance between the surface closest to the object side on the first lens group and the surface closest to the user's eye side on the third lens group; and $f_{II}$ represents the focal length of the second lens group.

10 Claims, 10 Drawing Sheets

SPHERICAL ABERRATION
CHROMATIC ABERRATION

LATERAL CHROMATIC ABERRATION

ASTIGMATISM

DISTORTION

ER 2.8

SPHERICAL
ABERRATION

CHROMATIC
ABERRATION

B= 12.9

LATERAL
CHROMATIC
ABERRATION

B= 12.9

ASTIGMATISM

B= 12.9

DISTORTION

FIG. 5
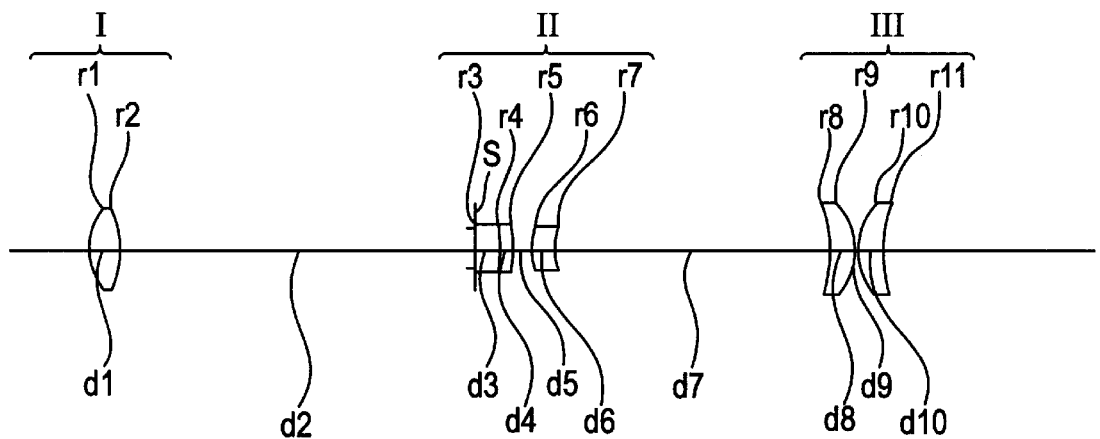
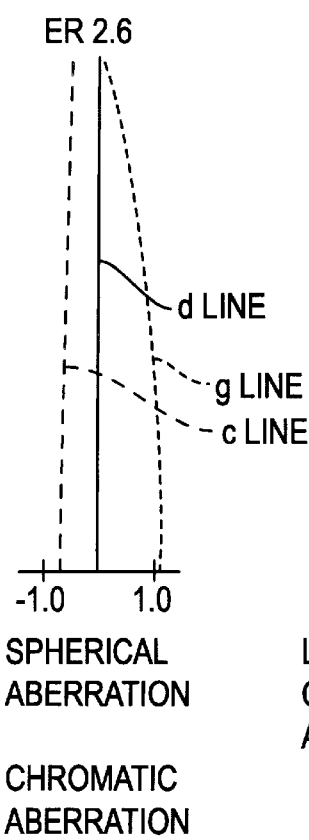
FIG. 6A
ER 2.6
d LINE
g LINE
c LINE
-1.0   1.0
SPHERICAL
ABERRATION
CHROMATIC
ABERRATION
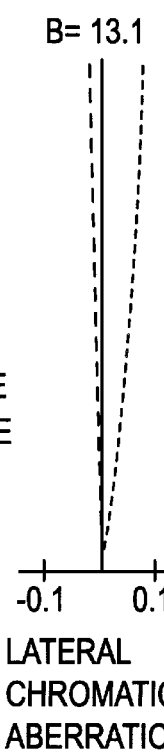
FIG. 6B
B= 13.1
-0.1   0.1
LATERAL
CHROMATIC
ABERRATION
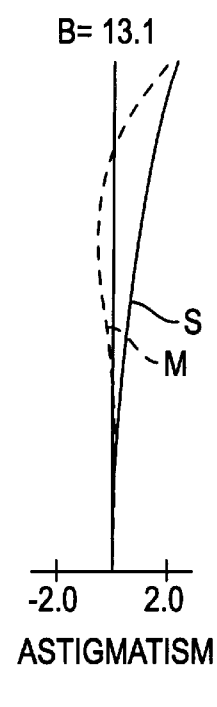
FIG. 6C
B= 13.1
S
M
-2.0   2.0
ASTIGMATISM
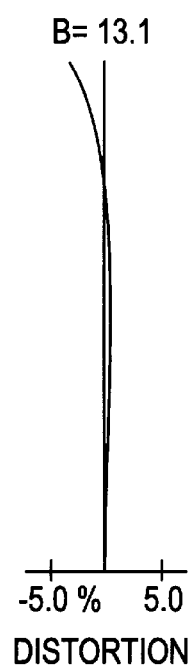
FIG. 6D
B= 13.1
-5.0 %   5.0
DISTORTION

ER 3.0

-1.0  1.0
SPHERICAL
ABERRATION

CHROMATIC
ABERRATION

B= 13.4

-0.1  0.1
LATERAL
CHROMATIC
ABERRATION

B= 13.4

-2.0  2.0
ASTIGMATISM

B= 13.4

-5.0 %  5.0
DISTORTION

FIG. 9
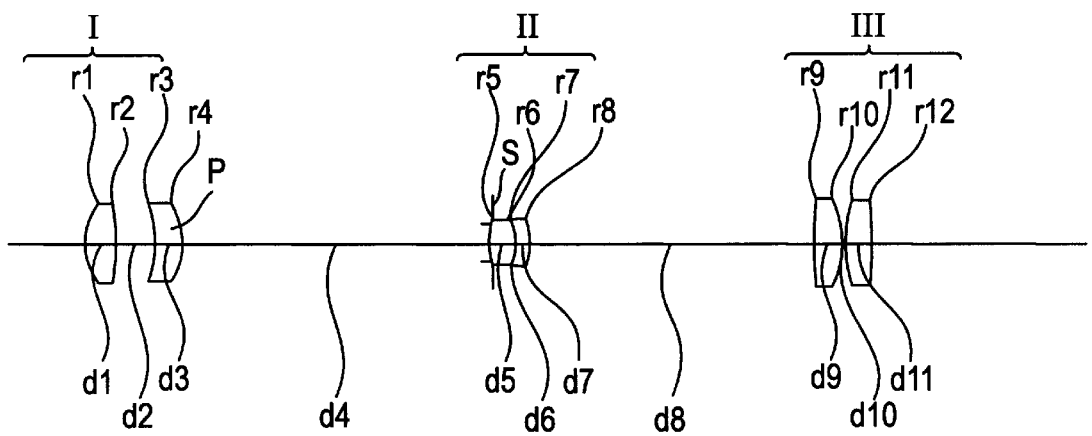
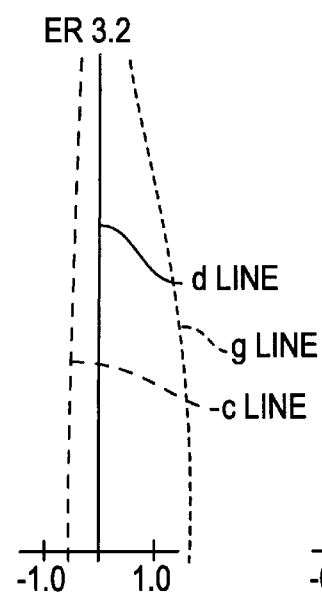
FIG. 10A
ER 3.2
-1.0    1.0
SPHERICAL
ABERRATION
CHROMATIC
ABERRATION
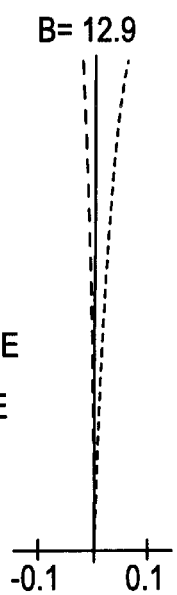
FIG. 10B
B= 12.9
-0.1    0.1
LATERAL
CHROMATIC
ABERRATION
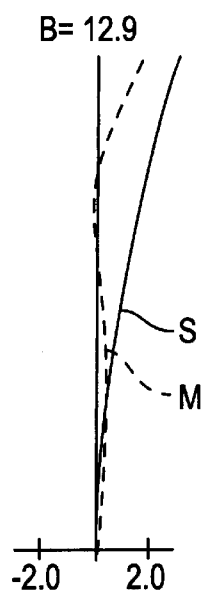
FIG. 10C
B= 12.9
-2.0    2.0
ASTIGMATISM
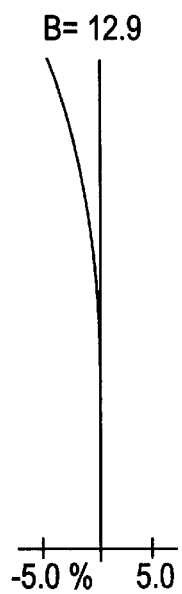
FIG. 10D
B= 12.9
-5.0 %   5.0
DISTORTION FIG. 11
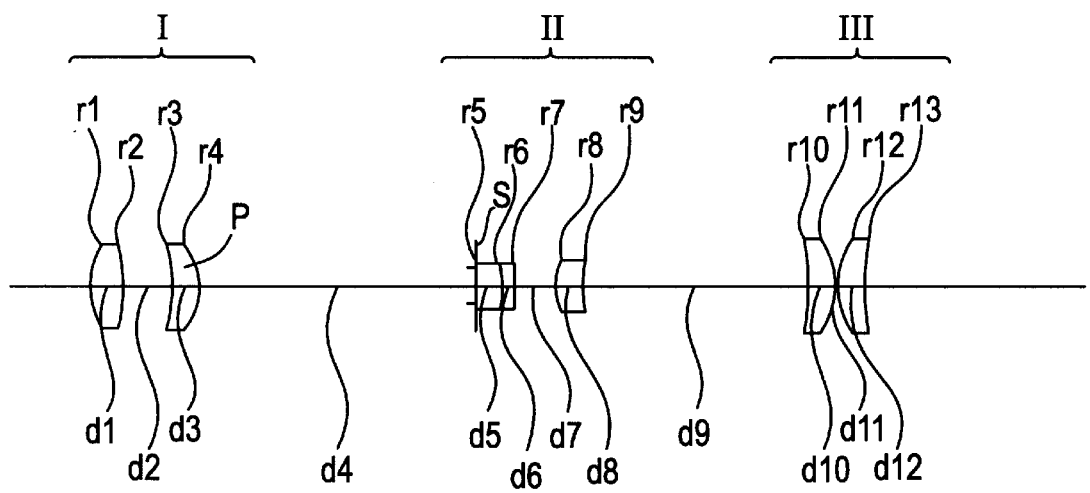
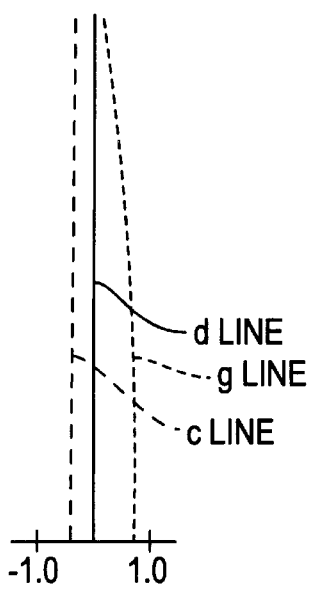
FIG. 12A
ER 3.5
SPHERICAL
ABERRATION
CHROMATIC
ABERRATION
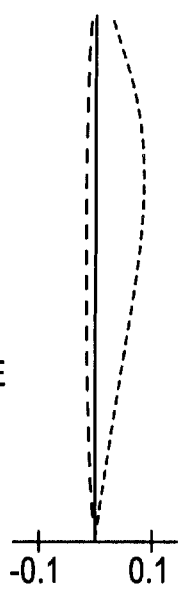
FIG. 12B
B= 13.2
LATERAL
CHROMATIC
ABERRATION
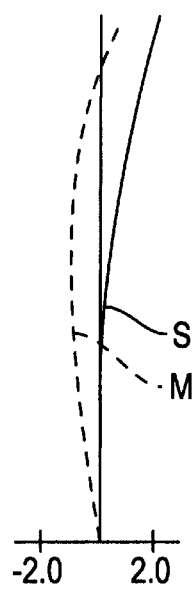
FIG. 12C
B= 13.2
ASTIGMATISM
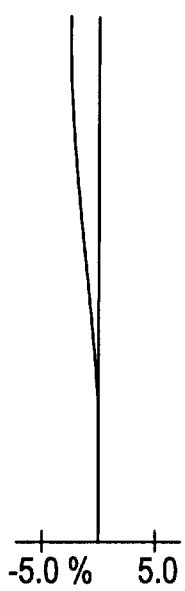
FIG. 12D
B= 13.2
DISTORTION

FIG. 13
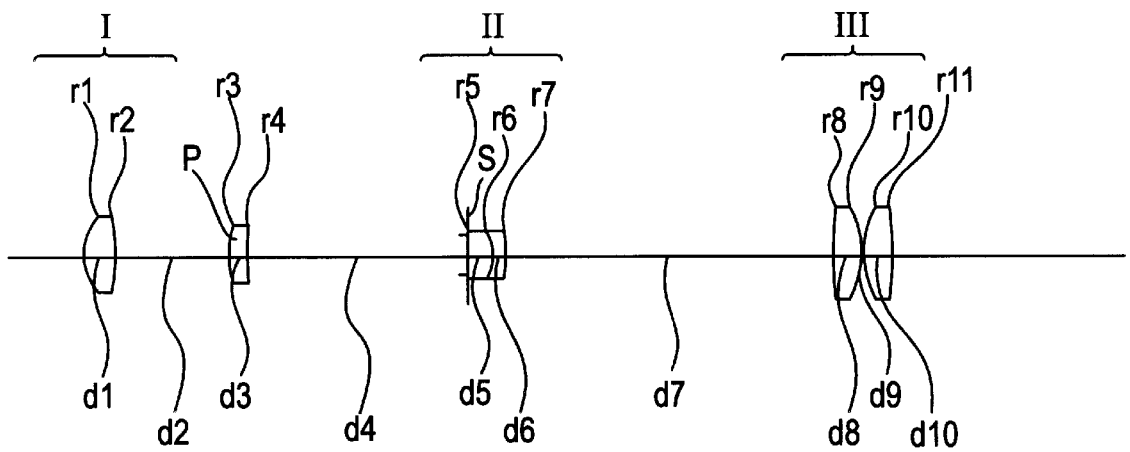
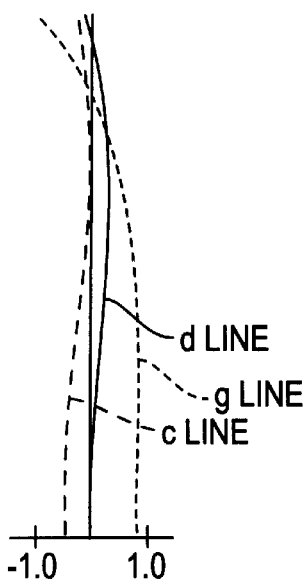
FIG. 14A
ER 3.4
SPHERICAL
ABERRATION
CHROMATIC
ABERRATION
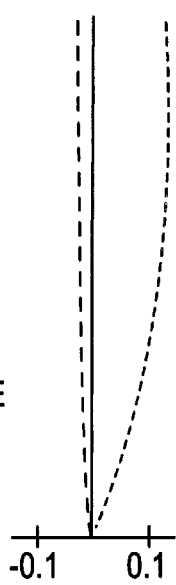
FIG. 14B
B= 13.2
LATERAL
CHROMATIC
ABERRATION
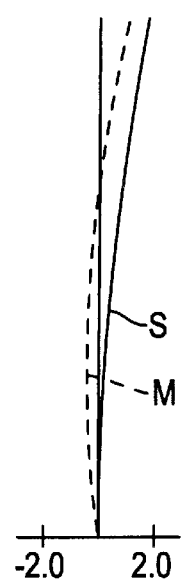
FIG. 14C
B= 13.2
ASTIGMATISM
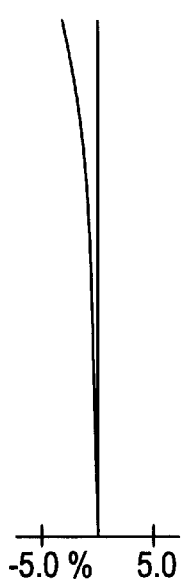
FIG. 14D
B= 13.2
DISTORTION FIG. 15
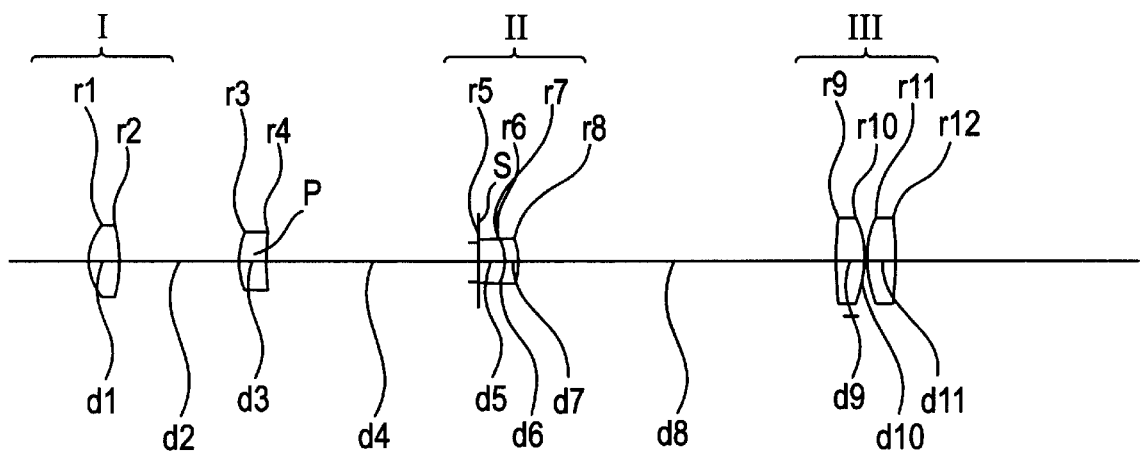
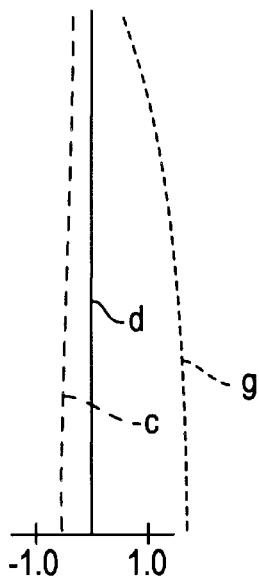
FIG. 16A
ER 3.4
-1.0  1.0
SPHERICAL
ABERRATION
CHROMATIC
ABERRATION
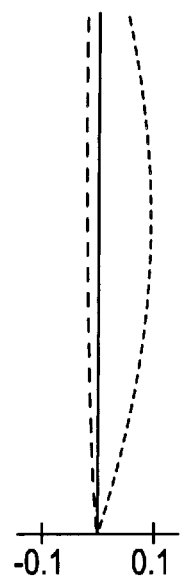
FIG. 16B
B= 13.2
-0.1  0.1
LATERAL
CHROMATIC
ABERRATION
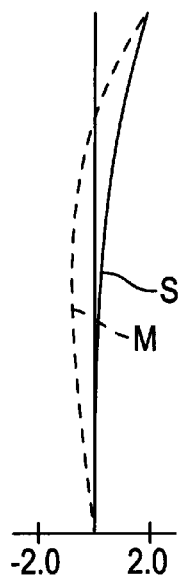
FIG. 16C
B= 13.2
-2.0  2.0
ASTIGMATISM
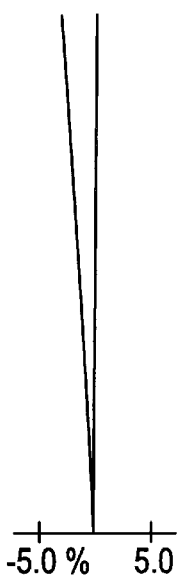
FIG. 16D
B= 13.2
-5.0 %  5.0
DISTORTION

FIG. 17
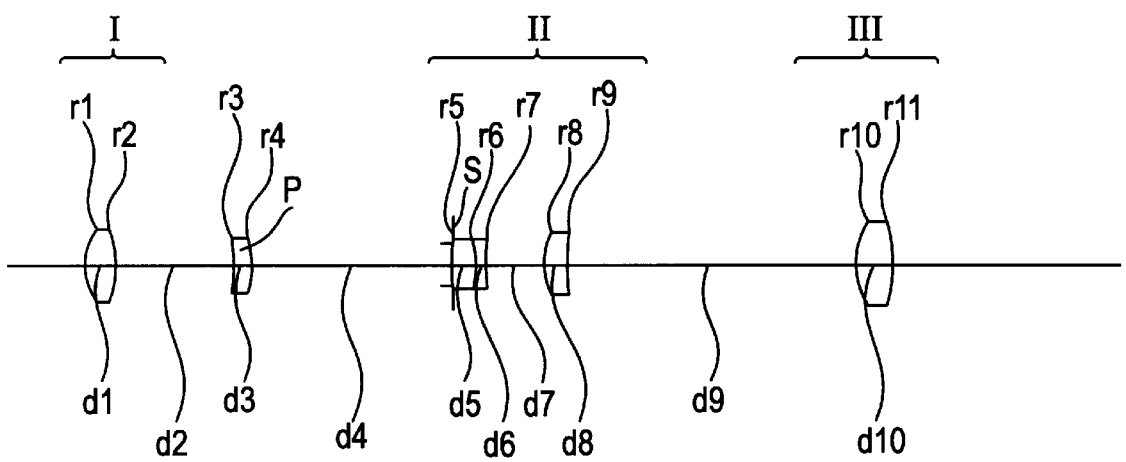
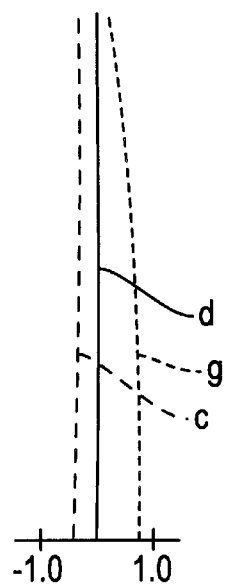
FIG. 18A
ER 3.7
SPHERICAL
ABERRATION
CHROMATIC
ABERRATION
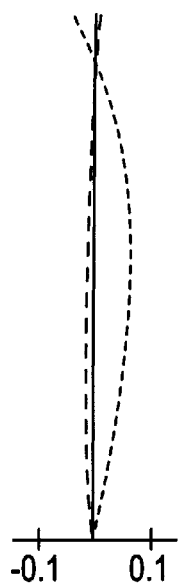
FIG. 18B
B= 13.3
LATERAL
CHROMATIC
ABERRATION
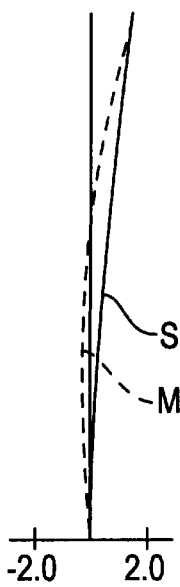
FIG. 18C
B= 13.3
ASTIGMATISM
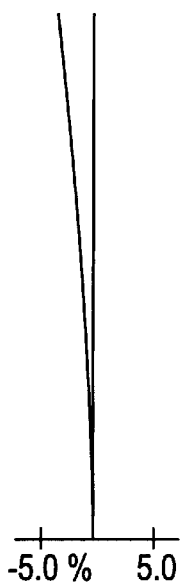
FIG. 18D
B= 13.3
DISTORTION

REAL-IMAGE TYPE OPTICAL FINDER

BACKGROUND OF THE INVENTION

1. Field of the Invention

The present invention relates to a real-image type optical finder which includes a relay lens system and which is provided independently from the photographing system.

2. Description of the Related Art

It is well known for a real-image type optical finder to include a positive first lens group, a positive second lens group (relay lens system), and a positive third lens group (eyepiece lens system), in this order from the object side. In this system, a primary image of an object is formed through the positive first lens group, a secondary image is formed through the second lens group which inverts the primary image to attain an erect image, and the secondary image can be viewed through the third lens group.

Further, a real-image type optical finder in which condenser lenses (positive lenses) are provided in the close vicinity of the primary and secondary images, respectively, so as to form an exit pupil at an appropriate position behind the eyepiece lens system, thereby facilitating viewing performance, is also known. However, a problem arises with an increased cost due to the increased number of positive lenses. Also, due to the increase of positive lenses, the Petzval sum becomes large which causes an increased field curvature, causing the periphery of the image to be blurred, making it difficult to attain a high quality image.

Moreover, in order to maintain a long eye relief (the distance between the user's eye and the closest lens surface of the eyepiece lens system), it is necessary for the eyepiece lens system to have a long focal length. However, if the focal length of the eyepiece lens system is lengthened, there is the problem of the size of the entire finder body increasing.

SUMMARY OF THE INVENTION

It is an object of the present invention to provide a real-image type optical finder having a relay lens system, of which aberrations such as coma and field curvature can be corrected, the number of lenses in the lens configuration are few, the entire system being compact, and having good optical performance.

According to an aspect of the present invention, there is provided a real-image type optical finder comprising a positive first lens group, a positive second lens group, and a positive third lens group, in that order from the object side. The primary image is formed through the positive first lens group, a secondary image is formed through the second lens group which inverts the primary image to attain an erect image, and the secondary image can be viewed through the third lens group; wherein the following condition (1) is satisfied:

$$5.0 < L/f_{II} < 7.0; \quad (1)$$

wherein:

L represents the distance between the surface closest to the object side on the first lens group and the surface closest to the user's eye side on the third lens group; and $f_{II}$ represents the focal length of the second lens group.

According to another aspect of the present invention, the real-image type optical finder further includes a positive single lens element located in the close vicinity of the primary image; wherein the following condition (2) is satisfied:

$$0.5 < L_c/f_c < 1.5; \quad (2)$$

wherein:

$L_c$ represents the distance between the surface of the positive single lens element on the object side and the surface closest to the object side of the second lens group; and $f_c$ represents the focal length of the positive single lens element.

According to another aspect of the present invention, the second lens group includes at least one negative lens element. Preferably, the negative lens element(s) satisfies the follow conditions (3) through (5):

$$-1.5 < f_{II}/f_{IIn} < -0.8; \quad (3)$$

$$0.3 < |r_{IIn}/f_{II}| < 0.9; \quad (4)$$

$$v_{IIn} < 40; \quad (5)$$

wherein:

$f_{IIn}$ represents the focal length of the negative lens element(s) within the second lens group;

$r_{IIn}$ represents the smallest radius of curvature of the concave surface(s) of the negative lens element(s) within the second lens group; and $v_{IIn}$ represents the average Abbe number of the negative lens element(s) within the second lens group.

More specifically, the second lens group can be either one of: 1) a positive lens and a negative lens or 2) a cemented lens having a positive lens element and a negative lens element and a single positive lens. In either case, the negative lens element preferably satisfies conditions (3) through (5).

According to a futher aspect of the present invention, the third lens group is composed of two positive lenses wherein the convex surfaces face each other. The two positive lenses can be, for example, meniscus lenses.

The present disclosure relates to subject matter contained in Japanese Patent Application No.9-159931 (filed on Jun. 17, 1997) which is expressly incorporated herein by reference in its entirety.

BRIEF DESCRIPTION OF THE DRAWINGS

The invention will be discussed below in detail with reference to the accompanying drawings, in which:

FIG. 5 is a schematic drawing showing the optical system for a real-image type optical finder of the third embodiment according to the present invention;

FIGS. 6A, 6B, 6C and 6D show aberration diagrams of the optical finder of FIG. 5;

FIG. 9 is a schematic drawing showing the optical system for a real-image type optical finder of the fifth embodiment according to the present invention;

FIGS. 10A, 10B, 10C, and 10D show aberration diagrams of the optical finder of FIG. 9;

FIG. 11 is a schematic drawing showing the optical system for a real-image type optical finder of the sixth embodiment according to the present invention;

FIGS. 12A, 12B, 12C and 12D show aberration diagrams of the optical finder of FIG. 11;

FIG. 13 is a schematic drawing showing the optical system for a real-image type optical finder of the seventh embodiment according to the present invention;

FIGS. 14A, 14B, 14C and 14D show aberration diagrams of the optical finder of FIG. 13;

FIG. 15 is a schematic drawing showing the optical system for a real-image type optical finder of the eighth embodiment according to the present invention;

FIGS. 16A, 16B, 16C and 16D show aberration diagrams of the optical finder of FIG. 15;

FIG. 17 is a schematic drawing showing the optical system for a real-image type optical finder of the ninth embodiment according to the present invention;

FIGS. 18A, 18B, 18C and 18D show aberration diagrams of the optical finder of FIG. 17;

DESCRIPTION OF THE PREFERRED EMBODIMENT

Figure 19:
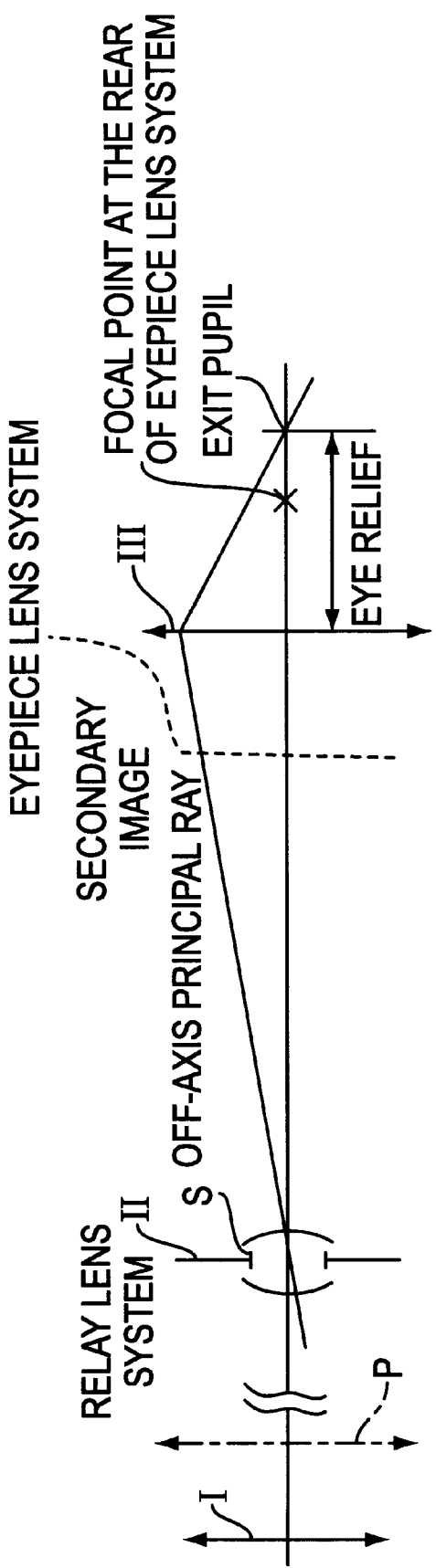
FIG. 19 is a conceptual drawing of an optical system for a finder according to the present invention.

FIG. 19 shows an example of the configuration of a real-image type optical finder having a relay optical system according to the present invention. The relay real-image type optical finder of the present invention is composed of, from the object side, a positive first lens group (I) (objective lens system), a positive second lens group (II) (relay lens system and image erecting optical system), and a positive third lens group (III) (eyepiece lens system). In this system, according to the present embodiment, a suitable eye relief is achieved without the need of installing a condenser lens in the close vicinity of the secondary image by appropriately making the focal length of the second lens group (II) longer and by decreasing the angle of emission of the off-axis light rays emitted from the second lens group (II).

A condenser lens (P) composing of a positive single lens element can be positioned in the close vicinity of the primary image formed by the first lens group (I).

Moreover, by appropriately making the focal length of the second lens group longer and the angle of view thereof smaller so that the second lens group have ample optical performance, and by including at least one negative lens element within the second lens group, coma, curvature of field and other such aberrations can be corrected, and hence, a relay real-image type optical finder having a high optical performance can be attained.

The real-image type optical finder having the relay optical system mentioned above forms an exit pupil behind the third lens group (with respect to the object side). The exit pupil is an image of a fixed diaphragm formed by the optical system located behind the diaphragm. Since the principal rays of all the off-axis light rays that are emitted from the third lens group cross the optical axis in the vicinity of the exit pupil, if the pupil of the user's eye is located at the same position of the exit pupil upon viewing the image, the entire field of view of the finder can be observed without any obstruction.

The distance between the last lens surface of the third lens group (the closest surface to the user's eye) and the exit pupil is called as 'eye relief', which represents an index for attaining an ease of viewing of the finder image. If the eye relief is too short, the user cannot observe all of the finder image, for example, in the case when the user is wearing glasses and cannot draw his/her eye close enough to the third lens group. Conversely, if the eye relief is too long, the user would have to keep his/her eyes at a distance far enough from the finder so that when the user is getting ready to operate the camera, he/she is unable to easily manage to position his/her eye appropriately with respect to the finder, and hence, the user's field of view can frequently 'black out' due to the difficulty of the user keeping his/her hand (which is holding the camera) steady.

Furthermore, since the size of the third lens group is determined according to the eye relief and exit angle (apparent visual angle), the size of the third lens group increases as the eye relief increases.

It has been determined, due to consideration of the above-mentioned problems, that the ideal eye relief be set at approximately 18 mm.

In a real-image type optical finder having a relay optical system, coma easily occurs in the off-axis light rays due to the second lens group being high powered. Accordingly, it is preferable that the principal rays of the off-axis light pass through as close to the center of the second lens group as possible to facilitate aberration correction. Therefore, it is preferable that a fixed diaphragm or conjugate point thereof be placed in the close vicinity of the principal point of the second lens group. The image of the fixed diaphragm is formed behind the third lens group by an optical system located behind the fixed diaphragm.

As mentioned above, a real-image type optical finder having the relay optical system of the prior art has a condenser lens that is positioned close to the secondary image, so that the focal length of the optical finder is less than or equal to the distance between the principal point of the second lens group and the condenser lens. Since a fixed diaphragm is located in the vicinity of the principal point of the second lens group, the principal light ray may slightly converge upon passing through the condenser lens, so that the exit pupil is formed closer to the object side than the rear focal point of the third lens group. In other words, the eye relief is shorter than the focal length of the third lens group.

Conversely, according to the present embodiment, since the real-image type optical finder does not have a condenser lens located near the secondary image, the divergent principal light rays emitted from the principal point of the second lens group (II) directly form the exit pupil closer to the eye of the user than the rear focal point of the third lens group (III) (see FIG. 19). Accordingly, the eye relief becomes longer than the focal length of the third lens group (III).

In this case, the focal length of the second lens group (II) is appropriately lengthened and the angle of the off-axis light rays emitted from the second lens group (II) are decreased, and accordingly, an ideal eye relief can be attained.

Moreover, the construction of the present embodiment is such that aberrations that occur in the first and third lens groups (I) and (III), respectively, are corrected in the second lens group (II), and hence, a high optical performance can be attained at low cost. Optimum optical performance in the second lens group (II), which is used for correcting aberration, has been achieved by appropriately lengthening the focal length and decreasing the angle-of-view thereof, making the correction of aberration a relatively easy task.

Condition (1) stipulates the angle of the emitted principal ray of the off-axis light rays emitted from the second lens group (II); maintains a suitable eye relief; and in order to appropriately decrease the angle-of-view of the second lens group (II), finds the appropriate focal length of the second lens group (II).

If the lower limit of condition (1) is exceeded, when the length of the focal length of the second lens group (II) increases, the exit angle of the principal ray of the off-axis light rays emitted from the second lens group (II) becomes too small, the eye relief not only becomes too small, the focal lengths of the first and third lens groups (I) and (III) have to be shortened in order to avoid an increased size (length) of the entire optical system; and excessive aberration such as spherical aberration and coma tends to occur in both the first and third lens groups (I) and (III).

If the upper limit of condition (1) is exceeded, the eye relief becomes too long; allowing field-of-view black-out to occur, and correcting aberrations due to the increase of the angle-of-view of the second lens group (II) becomes difficult.

In the optical system of the finder of the present embodiment, as mentioned above, optimum optical performance can be achieved even without utilizing a condenser lens (group) near the primary and secondary images, and the number of lenses can be greatly reduced throughout the optical system. If a condenser lens is utilized near the primary image, since the exit angle of the principal ray of the off-axis light rays emitted from the first lens group (I) can be altered by the condenser lens, ease of aberration correction and a high optical performance can be achieved.

Condition (2) stipulates the power of the condenser lens which is composed of positive single lens element when it is positioned near the primary image.

If the lower limit of condition (2) is exceeded, the power of the positive single lens element becomes too weak, and since the off-axis light rays pass through at a position distant from the optical axis of the high powered positive first lens group (I), excessive coma outside the optical axis occurs.

If the upper limit of condition (2) is exceeded, the power of the single lens element positioned near the primary image becomes too great, and excessive negative distortion occurs.

In a relay real-image type optical finder, since the first, second and third lens groups each have positive power, the construction thereof is composed of many positive lenses, and an inherent tendency for spherical aberration, coma and the like, are greatly increased. Furthermore, since the Petzval sum increases, so does the curvature field.

Condition (3) reduces the Petzval sum and the amount of field-of-curvature by appropriately increasing the power of the negative lens element(s) within the second lens group.

If the lower limit of condition (3) is exceeded, the negative power of the negative lens element(s) in the second lens group becomes too large, and excessive spherical aberration and coma occurs.

If the upper limit of condition (3) is exceeded, the power of the negative lens within the second lens group will be insufficient, making it impossible to correct the curvature-of-field.

Condition (4) concerns achieving accurate aberration correction by appropriately decreasing the radius of curvature of the concave surface of the negative lens element which is the smallest of the concave surface(s) of the negative lens element(s) within the second lens group (II).

If the lower limit of condition (4) is exceeded, the radius of curvature of the negative lens in the second lens group becomes too small, and excessive spherical aberration and coma occurs.

If the upper limit of condition (4) is exceeded, the radius of curvature of the negative lens in the second lens group becomes too large, making it impossible to correct spherical aberration or the like.

Condition (5) attains a small (average) Abbe number for the negative lens element(s) in the second lens group, of which aberration correction is performed, in order to sufficiently correct chromatic aberration.

If the upper limit of condition (5) is exceeded, when the average Abbe number of the negative lens in the second lens group becomes large, it becomes increasingly difficult to correct chromatic aberration which occurs throughout the entire optical system.

[The First Embodiment]

Figure 1:
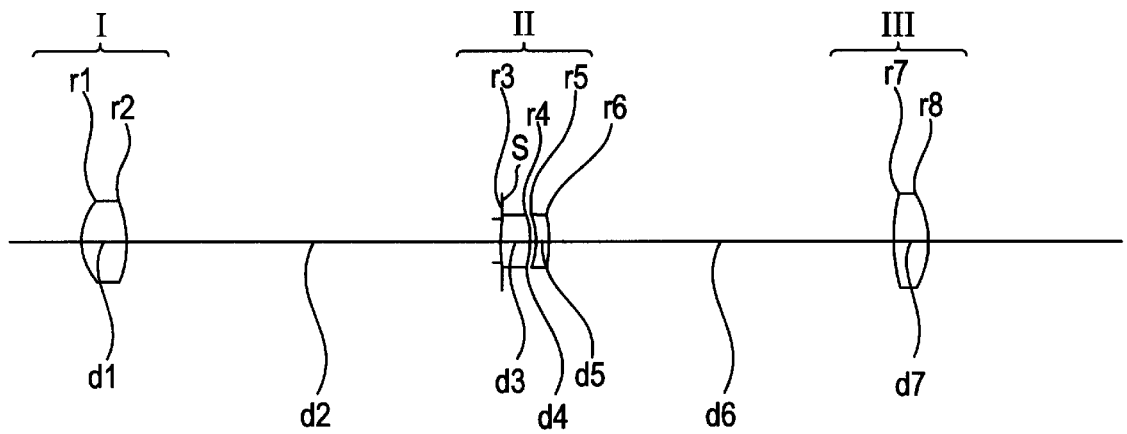
FIG. 1 is a schematic drawing showing the optical system for a real-image type optical finder of the first embodiment according to the present.
Figure 2A:
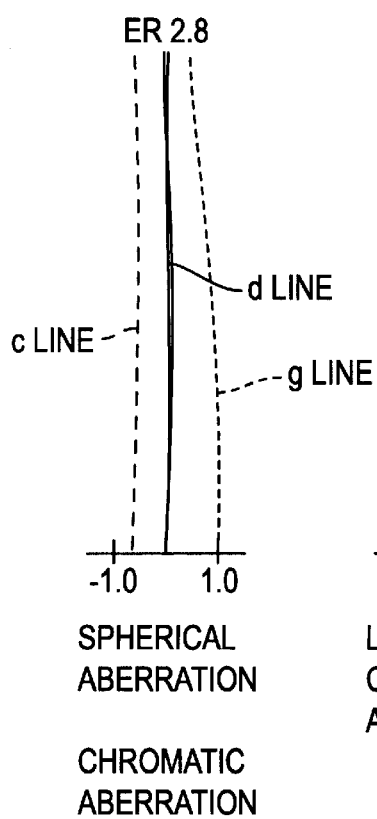
FIGS. 2A, 2B, 2C and 2D show aberration diagrams of the optical finder of FIG. 1.
Figure 2B:
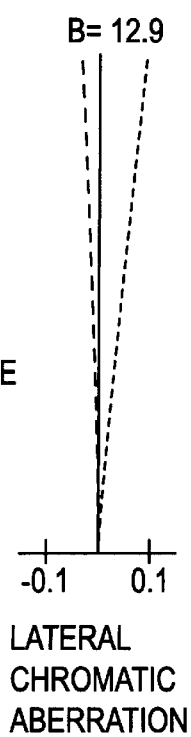
Figure 2C:
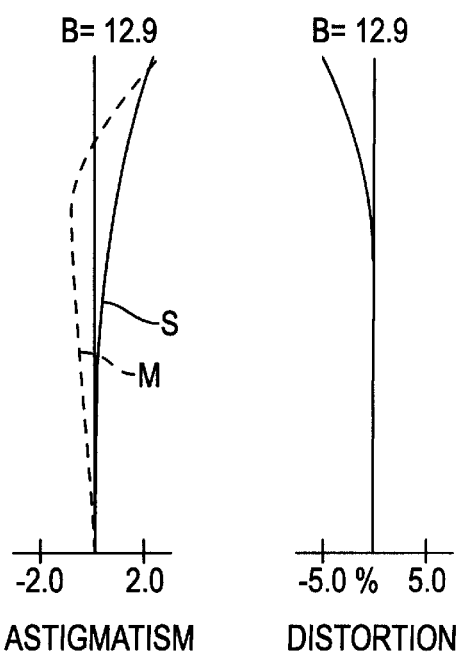
Figure 2D:
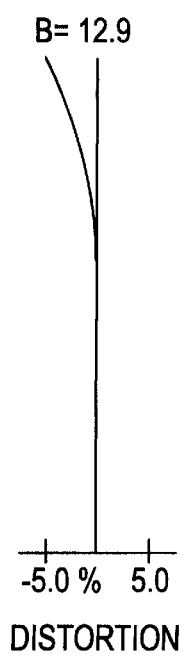

FIG. 1 shows the lens configuration of the first embodiment according to the present invention and FIGS. 2A, 2B, 2C and 2D show aberration diagrams thereof. The lens system is composed of, from the object side, a first lens group (I) composing of a positive single lens element, a fixed diaphragm S, a positive second lens group (II) composed of a positive lens element and a negative lens element, and a third lens group (III) composed of a positive single lens element. The fixed diaphragm S is fixed at a position 0.32 mm from the outer most point on the surface (surface No. 3) of the second lens group (II) closest to the object side toward the third lens group (III) side, the diameter of which being 7.0 mm. Surface No. 9 represents the exit pupil.

Table 1 shows the numerical data for the first embodiment. In the following tables and drawings, R represents the radius of curvature, D the distance between the lens surfaces, Nd the refractive index of the d-line, and νd the Abbe number. While in the aberration diagrams, d-line, g-line and C-line each represent the chromatic aberrations represented by spherical aberrations and lateral chromatic aberrations at the respective wavelengths, S represents the image surface of the Sagittal image, and M represents the image surface of the Meridional image.

The shape of a rotation-symmetry aspherical surface can be generally expressed as follows.

$$X = CY^2/1 + \{1-(1+k)C^2Y^2\}^{1/2} + A4Y^4 + A6Y^6 + A8Y^8 + A10Y^{10} + \ldots$$

wherein,

Y represents a height above the axis,

X represents a distance from a tangent plane of an aspherical vertex,

C represents a curvature of the aspherical vertex (1/r), k represents a conic constant, A4 represents a fourth-order aspherical aberration factor, A6 represents a sixth-order aspherical aberration factor, A8 represents an eighth-order aspherical aberration factor; and A10 represents a tenth-order aspherical aberration factor.

TABLE 1

| Surface No. | R | D | $N_d$ | $\nu_d$ |
| --- | --- | --- | --- | --- |
| 1* | 9.426 | 6.00 | 1.49176 | 57.4 |
| 2* | −9.438 | 50.10 | — | — |
| 3 | 19.588 | 4.00 | 1.69680 | 55.5 |
| 4 | −10.415 | 0.68 | — | — |
| 5 | −8.983 | 1.60 | 1.80518 | 25.4 |
| 6 | −22.736 | 46.96 | — | — |

TABLE 1-continued

| Surface No. | R | D | $N_d$ | $v_d$ |
|---|---|---|---|---|
| 7* | 16.807 | 5.00 | 1.49176 | 57.4 |
| 8* | -11.618 | 19.12 | — | — |
| 9 | ∞ | — | — | — |

"*" indicates the rotational symmetry aspherical surface.
Aspherical surface data:
No.1 K = 0.0, A4 = 0.11900 × $10^{-3}$, A6 = 0.0
No.2 K = 0.0, A4 = 0.91200 × $10^{-3}$, A6 = 0.0
No.7 K = 0.0, A4 = -0.29520 × $10^{-3}$, A6 = 0.44200 × $10^{-6}$
No.8 K = 0.0, A4 = 0.0, A6 = -0.18200 × $10^{-6}$

[The Second Embodiment]

Figure 3:
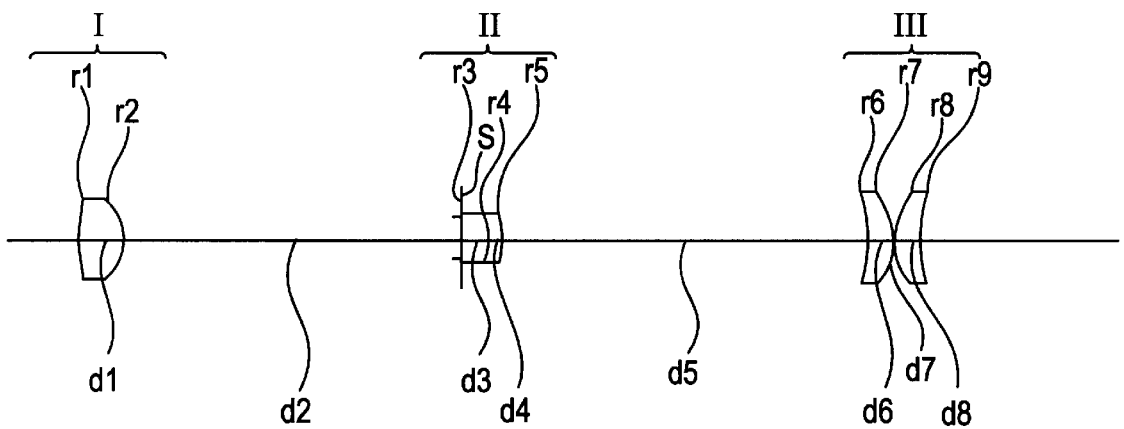
FIG. 3 is a schematic drawing showing the optical system for a real-image type optical finder of the second embodiment according to the present invention.
Figure 4A:
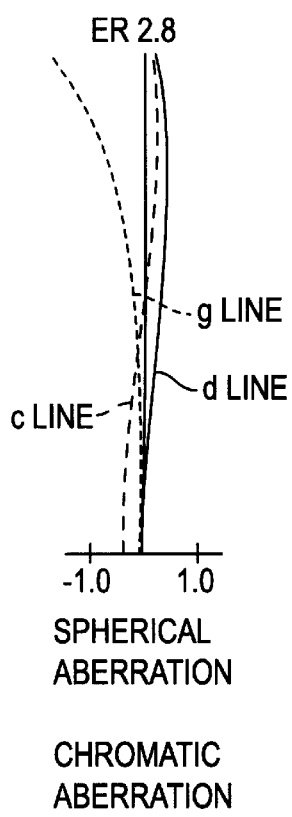
FIGS. 4A, 4B, 4C and 4D show aberration diagrams of the optical finder of FIG. 3.
Figure 4B:
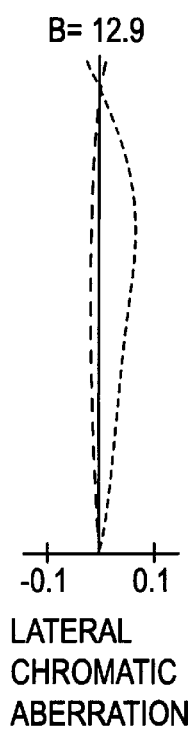
Figure 4C:
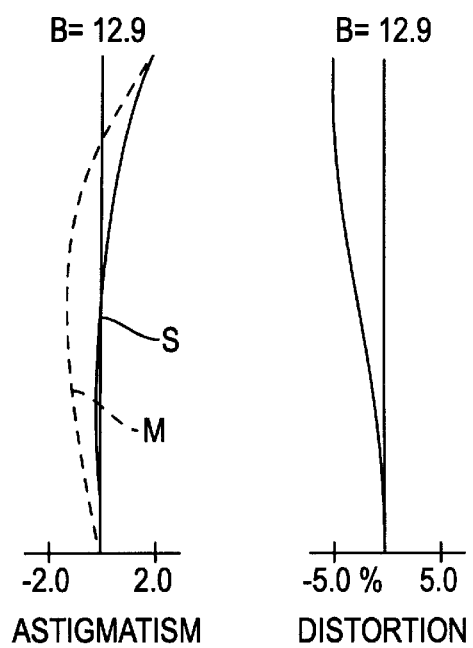
Figure 4D:
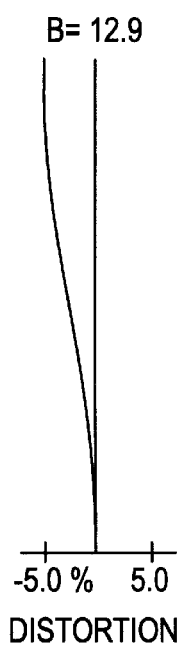

FIG. 3 shows the lens configuration of the second embodiment according to the present invention, and FIGS. 4A, 4B, 4C and 4D show aberration diagrams thereof. The numerical lens data is shown in table 2. The first lens group (I) is composed of a positive single lens element. The second lens group (II) is composed of a cemented lens having a positive lens element and a negative lens element. The third lens group (III) is composed of two positive meniscus lenses of which the concave surfaces face each other. The fixed diaphragm S is fixed at a position 0.20 mm from the outer most point on the surface of the second lens group (II) closest to the object side (surface No. 3) toward the third lens group (III) side, the diameter of which being 6.4 mm. Surface No.10 represents the exit pupil.

TABLE 2

| Surface No. | R | D | $N_d$ | $v_d$ |
|---|---|---|---|---|
| 1* | 10.127 | 6.00 | 1.49176 | 57.4 |
| 2* | -8.559 | 45.48 | — | — |
| 3 | 25.248 | 4.00 | 1.70000 | 48.1 |
| 4 | -7.011 | 1.60 | 1.80518 | 25.4 |
| 5 | -19.340 | 49.62 | — | — |
| 6* | -24.413 | 3.50 | 1.49176 | 57.4 |
| 7 | -10.233 | 0.50 | — | — |
| 8 | 10.233 | 3.50 | 1.49176 | 57.4 |
| 9* | 24.413 | 19.84 | — | — |
| 10 | ∞ | — | — | — |

"*" indicates the rotational symmetry aspherical surface.
Aspherical surface data:
No.1 K = 0.0, A4 = -0.10940 × $10^{-2}$, A6 = 0.0
No.2 K = 0.0, A4 = -0.28920 × $10^{-3}$, A6 = 0.0
No.6 K = 0.0, A4 = -0.10920 × $10^{-3}$, A6 = 0.34500 × $10^{-6}$
No.9 K = 0.0, A4 = 0.10920 × $10^{-3}$, A6 = -0.34500 × $10^{-6}$

[The Third Embodiment]

FIG. 5 shows the lens configuration of the third embodiment according to the present invention, and FIGS. 6A, 6B, 6C and 6D show aberration diagrams thereof. The numerical lens data is shown in table 3. The first lens group (I) is composed of a positive single lens element. The second lens group (II) is composed of a cemented lens of a positive lens element and a negative lens element and a (separate) negative lens element. The third lens group (III) is composed of two positive meniscus lenses of which the convex surfaces face each other. The fixed diaphragm S is fixed at a position 0.25 mm from the outer most point on the surface of the second lens group (II) closest to the object side (surface No. 3) toward the third lens group (III) side, the diameter of which being 6.0 mm. Surface No.12 represents the exit pupil.

TABLE 3

| Surface No. | R | D | $N_d$ | $v_d$ |
|---|---|---|---|---|
| 1 | 9.466 | 4.00 | 1.49176 | 57.4 |
| 2* | -9.545 | 45.98 | — | — |
| 3 | 18.200 | 3.50 | 1.69680 | 55.5 |
| 4 | -9.164 | 1.60 | 1.76182 | 26.6 |
| 5 | -32.170 | 2.46 | — | — |
| 6* | 9.020 | 3.00 | 1.49176 | 57.4 |
| 7 | 8.000 | 36.16 | — | — |
| 8* | -18.723 | 3.50 | 1.49176 | 57.4 |
| 9 | -8.747 | 0.50 | — | — |
| 10 | 8.747 | 3.50 | 1.49176 | 57.4 |
| 11* | 18.723 | 18.36 | — | — |
| 12 | ∞ | — | — | — |

"*" indicates the rotational symmetry aspherical surface.
Aspherical surface data:
No.2 K = 0.0, A4 = 0.74000 × $10^{-3}$, A6 = -0.12268 × $10^{-5}$
No.6 K = 0.0, A4 = -0.91000 × $10^{-4}$, A6 = -0.96900 × $10^{-6}$
No.8 K = 0.0, A4 = -0.14080 × $10^{-3}$, A6 = -0.13590 × $10^{-5}$
No.11 K = 0.0, A4 = 0.14080 × $10^{-3}$, A6 = 0.13590 × $10^{-5}$

[The Fourth Embodiment]

Figure 7:
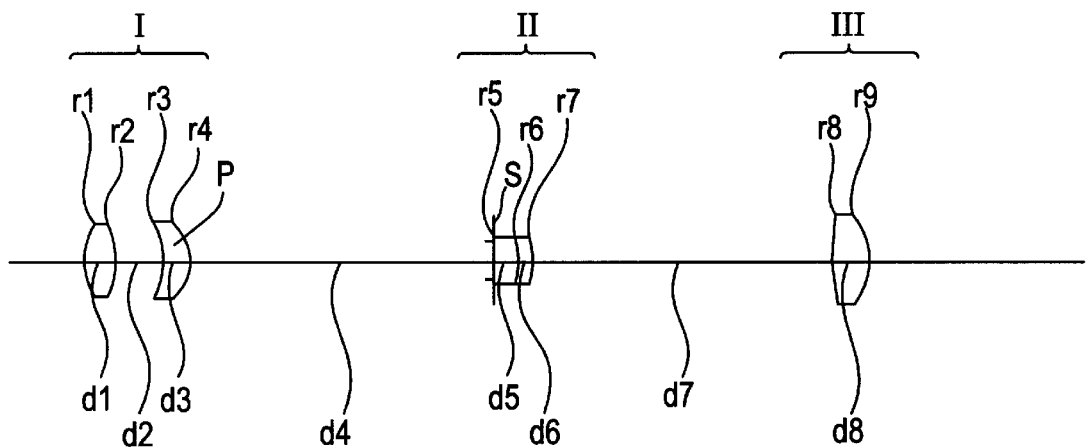
FIG. 7 is a schematic drawing showing the optical system for a real-image type optical finder of the fourth embodiment according to the present invention.
Figure 8A:
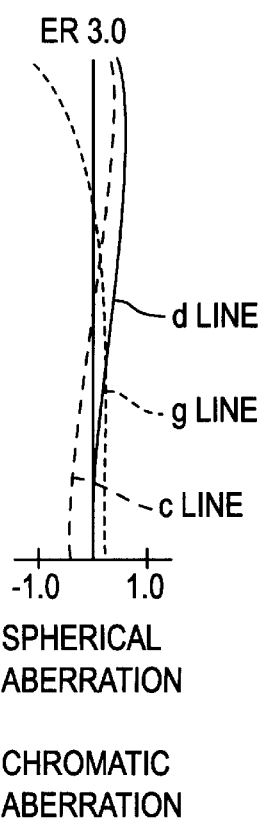
FIGS. 8A, 8B, 8C and 8D show aberration diagrams of the optical finder of FIG. 7.
Figure 8B:
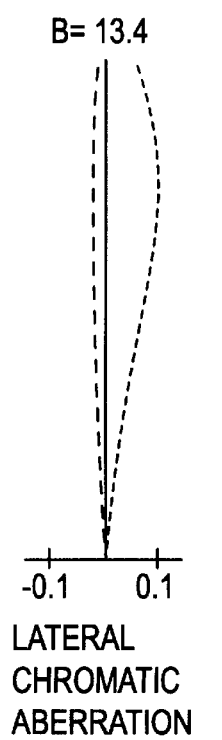
Figure 8C:
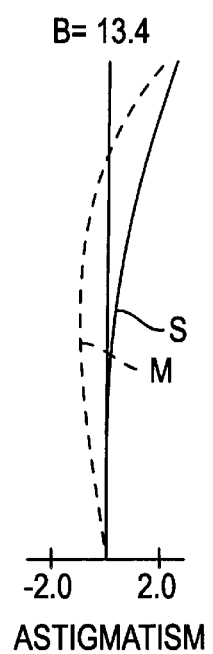
Figure 8D:
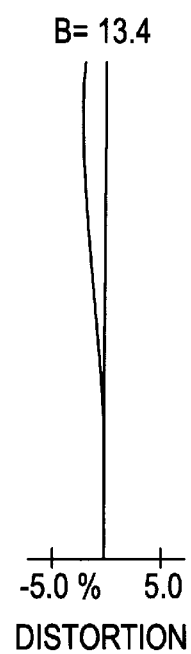

FIG. 7 shows the lens configuration of the fourth embodiment according to the present invention, and FIGS. 8A, 8B, 8C and 8D show aberration diagrams thereof. The numerical lens data is shown in table 4. The first lens group (I) is composed of a positive single lens element. The second lens group (II) is composed of a cemented lens of a positive lens element and a negative lens element. The third lens group (III) is composed of a positive single lens element. Located in the close vicinity of the primary image formed by the first lens group (I) is a condenser lens P consisting of a positive single lens element. The fixed diaphragm S is fixed at a position 0.23 mm from the outer most point on the surface of the second lens group (II) closest to the object side (surface No.5) toward the third lens group (III) side, the diameter of which being 6.0 mm. Surface No.10 represents the exit pupil.

TABLE 4

| Surface No. | R | D | $N_d$ | $v_d$ |
|---|---|---|---|---|
| 1 | 11.196 | 4.00 | 1.49176 | 57.4 |
| 2* | -10.528 | 6.00 | — | — |
| 3* | -11.441 | 3.50 | 1.49176 | 57.4 |
| 4 | -8.186 | 40.60 | — | — |
| 5 | 19.397 | 3.50 | 1.70000 | 48.1 |
| 6 | -6.511 | 1.60 | 1.80518 | 25.4 |
| 7 | -19.394 | 40.00 | — | — |
| 8* | 19.725 | 5.00 | 1.49176 | 57.4 |
| 9* | -9.981 | 19.57 | — | — |
| 10 | ∞ | — | — | — |

"*" indicates the rotational symmetry aspherical surface.
Aspherical surface data:
No.2 K = 0.0, A4 = 0.82670 × $10^{-3}$, A6 = -0.36630 × $10^{-5}$
No.3 K = 0.0, A4 = 0.62780 × $10^{-3}$, A6 = -0.20180 × $10^{-4}$
No.8 K = 0.0, A4 = -0.30340 × $10^{-3}$, A6 = -0.11660 × $10^{-5}$
No.9 K = 0.0, A4 = 0.0, A6 = -0.11760 × $10^{-5}$

[The Fifth Embodiment]

FIG. 9 shows the lens configuration of the fifth embodiment according to the present invention, and FIGS. 10A, 10B, 10C and 10D show aberration diagrams thereof. The numerical lens data is shown in table 5. The first lens group (I) is composed of a positive single lens element. The second lens group (II) is composed of a positive lens element and a negative lens element. The third lens group (III) is composed of two positive lenses of which the convex surfaces face each other. Located in the close vicinity of the primary image formed by the first lens group (I) is a condenser lens P consisting of a positive single lens element. The fixed diaphragm S is fixed at a position 0.39 mm from the outer most point on the surface of the second lens group (II) closest to the object side (surface No.5) toward the third lens group (III) side, the diameter of which being 6.0 mm. Surface No.13 represents the exit pupil.

TABLE 5

| Surface No. | R | D | $N_d$ | $v_d$ |
|---|---|---|---|---|
| 1 | 8.794 | 4.00 | 1.49176 | 57.4 |
| 2* | −17.088 | 5.14 | — | — |
| 3* | −15.000 | 3.50 | 1.49176 | 57.4 |
| 4 | −11.226 | 40.65 | — | — |
| 5* | 11.858 | 3.50 | 1.49176 | 57.4 |
| 6 | −6.116 | 0.09 | — | — |
| 7 | −6.000 | 1.60 | 1.80518 | 25.4 |
| 8 | −10.852 | 38.22 | — | — |
| 9* | 170.011 | 3.50 | 1.49176 | 57.4 |
| 10 | −14.301 | 0.50 | — | — |
| 11* | 18.062 | 3.50 | 1.49176 | 57.4 |
| 12 | −72.678 | 18.81 | — | — |
| 13 | ∞ | — | — | — |

"*" indicates the rotational symmetry aspherical surface.
Aspherical surface data:
No.2 K = 0.0, A4 = 0.55750 × $10^{-3}$, A6 = 0.31220 × $10^{-5}$
No.3 K = 0.0, A4 = 0.14870 × $10^{-3}$, A6 = 0.0
No.5 K = 0.0, A4 = −0.37600 × $10^{-4}$, A6 = 0.27580 × $10^{-5}$
No.9 K = 0.0, A4 = 0.0, A6 = 0.17600 × $10^{-5}$
No.11 K = 0.0, A4 = 0.0, A6 = −0.19600 × $10^{-5}$

[The Sixth Embodiment]

FIG. 11 shows the lens configuration of the sixth embodiment according to the present invention, and FIGS. 12A, 12B, 12C and 12D show aberration diagrams thereof. The numerical lens data is shown in table 6. The first lens group (I) is composed of a positive single lens element. The second lens group (II) is composed of a cemented lens of a positive lens element and a negative lens element and a (separate) positive lens element. The third lens group (III) is composed of two positive meniscus lenses of which the convex surfaces face each other. Located in the close vicinity of the primary image formed by the first lens group (I) is a condenser lens P consisting of a positive single lens element. The fixed diaphragm S is fixed at a position 0.38 mm from the outer most point on the surface of the second lens group (II) closest to the object side (surface No.5) toward the third lens group (III) side, the diameter of which being 6.0 mm. Surface No.14 represents the exit pupil.

TABLE 6

| Surface No. | R | D | $N_d$ | $v_d$ |
|---|---|---|---|---|
| 1 | 11.652 | 4.00 | 1.49176 | 57.4 |
| 2* | −12.025 | 6.20 | — | — |
| 3* | −18.483 | 3.50 | 1.49176 | 57.4 |
| 4 | −8.150 | 35.40 | — | — |
| 5 | 11.970 | 3.50 | 1.69680 | 55.5 |
| 6 | −11.970 | 1.60 | 1.78472 | 25.7 |
| 7 | 70.160 | 5.20 | — | — |
| 8* | 8.000 | 3.50 | 1.49176 | 57.4 |
| 9 | 15.898 | 28.80 | — | — |
| 10* | −42.954 | 3.50 | 1.49176 | 57.4 |
| 11 | −10.866 | 0.50 | — | — |
| 12 | 10.866 | 3.50 | 1.49176 | 57.4 |

TABLE 6-continued

| Surface No. | R | D | $N_d$ | $v_d$ |
|---|---|---|---|---|
| 13* | 42.954 | 18.29 | — | — |
| 14 | ∞ | — | — | — |

"*" indicates the rotational symmetry aspherical surface.
Aspherical surface data:
No.2 K = 0.0, A4 = 0.74700 × $10^{-3}$, A6 = −0.45200 × $10^{-5}$
No.4 K = 0.0, A4 = −0.75000 × $10^{-4}$, A6 = 0.10130 × $10^{-4}$
No.8 K = 0.0, A4 = −0.27330 × $10^{-3}$, A6 = −0.40000 × $10^{-5}$
No.10 K = 0.0, A4 = −0.84900 × $10^{-4}$, A6 = 0.32200 × $10^{-6}$
No.13 K = 0.0, A4 = 0.84900 × $10^{-4}$, A6 = −0.32200 × $10^{-6}$

[The Seventh Embodiment]

FIG. 13 shows the lens configuration of the seventh embodiment according to the present invention, and FIGS. 14A, 14B, 14C and 14D show aberration diagrams thereof. The numerical lens data is shown in table 7. The first lens group (I) is composed of a positive single lens element. The second lens group (II) is composed of a cemented lens of a positive lens element and a negative lens element. The third lens group (III) is composed of two positive lenses of which the convex surfaces face each other. Located in the close vicinity of the primary image formed by the first lens group (I) is a condenser lens P consisting of a positive single lens element. The fixed diaphragm S is fixed at a position 0.35 mm from the outer most point on the surface of the second lens group (II) closest to the object side (surface No.5) toward the third lens group (III) side, the diameter of which being 6.2 mm. Surface No.12 represents the exit pupil.

TABLE 7

| Surface No. | R | D | $N_d$ | $v_d$ |
|---|---|---|---|---|
| 1 | 7.475 | 4.00 | 1.49176 | 57.4 |
| 2* | −11.354 | 14.44 | — | — |
| 3 | 15.601 | 2.50 | 1.49176 | 57.4 |
| 4* | −44.835 | 28.10 | — | — |
| 5 | 13.914 | 3.50 | 1.67003 | 47.3 |
| 6 | −6.798 | 1.60 | 1.80518 | 25.4 |
| 7 | −25.078 | 42.50 | — | — |
| 8* | 35.145 | 3.50 | 1.49176 | 57.4 |
| 9 | −13.399 | 0.50 | — | — |
| 10* | 20.000 | 3.50 | 1.49176 | 57.4 |
| 11 | 35.468 | 20.87 | — | — |
| 12 | ∞ | — | — | — |

"*" indicates the rotational symmetry aspherical surface.
Aspherical surface data:
No.2 K = 0.0, A4 = 0.11730 × $10^{-2}$, A6 = 0.0
No.4 K = 0.0, A4 = 0.11710 × $10^{-2}$, A6 = 0.0
No.8 K = 0.0, A4 = 0.0, A6 = −0.35200 × $10^{-5}$
No.10 K = 0.0, A4 = 0.19400 × $10^{-4}$, A6 = 0.46600 × $10^{-5}$

[The Eighth Embodiment]

FIG. 15 shows the lens configuration of the eighth embodiment according to the present invention, and FIGS. 16A, 16B, 16C and 16D show aberration diagrams thereof. The numerical lens data is shown in table 8. The first lens group (I) is composed of a positive single lens element. The second lens group (II) is composed of a positive lens element and a negative lens element. The third lens group (III) is composed of two concave positive lenses of which the concave surfaces face each other. Located in the close vicinity of the primary image formed by the first lens group (I) is a condenser lens P consisting of a positive single lens element. The fixed diaphragm S is fixed at a position 0.39 mm from the outer most point on the surface of the second lens group (II) closest to the object side (surface No.5) toward the third lens group (III) side, the diameter of which being 6.0 mm. Surface No.13 represents the exit pupil.

TABLE 8

| Surface No. | R | D | $N_d$ | $\upsilon_d$ |
|---|---|---|---|---|
| 1 | 7.505 | 4.00 | 1.49176 | 57.4 |
| 2* | −11.587 | 15.34 | — | — |
| 3 | 13.391 | 3.50 | 1.49176 | 57.4 |
| 4* | −46.253 | 27.26 | — | — |
| 5* | 11.867 | 3.50 | 1.49176 | 57.4 |
| 6 | −6.485 | 0.09 | — | — |
| 7 | −6.345 | 1.60 | 1.80518 | 25.4 |
| 8 | −11.903 | 41.41 | — | — |
| 9* | 692.530 | 3.50 | 1.49176 | 57.4 |
| 10 | −16.412 | 0.50 | — | — |
| 11 | 16.412 | 3.50 | 1.49176 | 57.4 |
| 12* | −692.530 | 22.55 | — | — |
| 13 | ∞ | — | — | — |

"*" indicates the rotational symmetry aspherical surface.
Aspherical surface data:
No.2 K = 0.0, A4 = 0.10950 × $10^{-2}$, A6 = 0.10880 × $10^{-5}$
No.4 K = 0.0, A4 = 0.26160 × $10^{-2}$, A6 = −0.72890 × $10^{-4}$
No.5 K = 0.0, A4 = −0.15400 × $10^{-4}$, A6 = 0.28510 × $10^{-5}$
No.9 K = 0.0, A4 = 0.18860 × $10^{-3}$, A6 = −0.25090 × $10^{-5}$
No.12 K = 0.0, A4 = −0.18860 × $10^{-3}$, A6 = 0.25090 × $10^{-5}$

[The Ninth Embodiment]

FIG. 17 shows the lens configuration of the ninth embodiment according to the present invention, and FIGS. 18A, 18B, 18C and 18D show aberration diagrams thereof. The numerical lens data is shown in table 9. The first lens group (I) is composed of a positive single lens element. The second lens group (II) is composed of a cemented lens of a positive lens element and a negative lens element and a (separate) positive lens element. The third lens group (III) is composed of a positive single lens element. Located in the close vicinity of the primary image formed by the first lens group (I) is a condenser lens P consisting of a positive single lens element. The fixed diaphragm S is fixed at a position 0.33 mm from the outer most point on the surface of the second lens group (II) closest to the object side (surface No.5) toward the third lens group (III) side, the diameter of which being 6.4 mm. Surface No.12 represents the exit pupil.

TABLE 9

| Surface No. | R | D | $N_d$ | $\upsilon_d$ |
|---|---|---|---|---|
| 1 | 8.166 | 4.00 | 1.49176 | 57.4 |
| 2* | −8.905 | 14.80 | — | — |
| 3 | −105.680 | 2.50 | 1.49176 | 57.4 |
| 4* | −10.198 | 25.70 | — | — |
| 5 | 15.528 | 3.00 | 1.69680 | 55.5 |
| 6 | −14.337 | 1.60 | 1.80518 | 25.4 |
| 7 | 55.549 | 7.20 | — | — |
| 8* | 9.000 | 3.00 | 1.49176 | 57.4 |
| 9 | 30.731 | 37.40 | — | — |
| 10* | 10.721 | 5.00 | 1.49176 | 57.4 |
| 11* | −23.604 | 19.61 | — | — |
| 12 | ∞ | — | — | — |

"*" indicates the rotational symmetry aspherical surface.
Aspherical surface data:
No.2 K = 0.0, A4 = 0.12300 × $10^{-2}$, A6 = 0.0
No.4 K = 0.0, A4 = 0.11530 × $10^{-2}$, A6 = 0.12550 × $10^{-5}$
No.8 K = 0.0, A4 = −0.16300 × $10^{-3}$, A6 = −0.14330 × $10^{-5}$
No.10 K = 0.0, A4 = 0.0, A6 = −0.65900 × $10^{-6}$
No.11 K = 0.0, A4 = 0.0, A6 = 0.11200 × $10^{-5}$ The values for each condition for each embodiment are shown in the following table 10.

TABLE 10

| | Cond. (1) | Cond. (2) | Cond. (3) | Cond. (4) | Cond. (5) |
|---|---|---|---|---|---|
| Embodiment 1 | 5.73 | — | −1.03 | 0.45 | 25.4 |
| Embodiment 2 | 5.95 | — | −1.32 | 0.37 | 25.4 |
| Embodiment 3 | 6.17 | — | −0.97 | 0.54 | 26.6 |
| Embodiment 4 | 6.13 | 0.94 | −1.32 | 0.38 | 25.4 |
| Embodiment 5 | 6.35 | 0.58 | −0.84 | 0.37 | 25.4 |
| Embodiment 6 | 6.64 | 1.33 | −1.16 | 0.80 | 25.7 |
| Embodiment 7 | 6.07 | 1.18 | −1.42 | 0.40 | 25.4 |
| Embodiment 8 | 5.96 | 1.27 | −0.90 | 0.36 | 25.4 |
| Embodiment 9 | 5.67 | 1.13 | −1.31 | 0.78 | 25.4 |

As can be clearly understood from the above table, each embodiment satisfies each condition. Furthermore, the various kinds of aberration has been accurately corrected, especially for the case of distortion aberration.

The present invention makes it possible to provide a real-image type optical finder having a relay optical system wherein coma and field curvature aberration can be corrected, the number of lenses are reduced, the finder is compact, and optimum optical performance can be achieved.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A real-image type optical finder comprising:
  a positive first lens group, a positive second lens group, and a positive third lens group, in this order from the object side;
  wherein the primary image is formed through said positive first lens group, a secondary image is formed through said second lens group which inverts said primary image to attain an erect image, and wherein said secondary image can be viewed through said third lens group; and
  wherein the following condition (1) is satisfied:

$$5.0 < L/f_{II} < 7.0; \qquad (1)$$

wherein:
  L represents the distance between the surface closest to the object of the first lens group and the surface closest to the user's eye of the third lens group; and
  $f_{II}$ represents the focal length of the second lens group.

2. A real-image type optical finder according to claim 1, further comprising a positive single lens element located in the close vicinity of the primary image, and wherein the following condition (2) is satisfied:

$$0.5 < L_c/f_c < 1.5; \qquad (2)$$

wherein:
  $L_c$ represents the distance between the surface of the positive single lens element on the object side and the surface closest to the object of the second lens group; and
  $f_c$ represents the focal length of the positive single lens element.

3. A real-image type optical finder according to claim 1, wherein said second lens group comprises at least one negative lens element.

4. A real-image type optical finder according to claim 3, wherein said at least one negative lens element satisfies the following conditions (3) through (5):

$$-1.5 < f_{II}/f_{IIn} < -0.8; \quad (3)$$

$$0.3 < |r_{IIn}/f_{II}| < 0.9; \quad (4)$$

$$\nu_{IIn} < 40; \quad (5)$$

wherein:

$f_{IIn}$ represents the focal length of said at least one negative lens element within the second lens group;

$r_{IIn}$ represents the smallest radius of curvature of the concave surface(s) of the negative lens element(s) within the second lens group; and $\nu_{IIn}$ represents the average Abbe number of said at least one negative lens element within the second lens group.

5. A real-image type optical finder according to claim 3, wherein said second lens group comprises a positive lens element and a negative lens element.

6. A real-image type optical finder according to claim 5, wherein said negative lens element satisfies the following conditions (3) through (5):

$$-1.5 < f_{II}/f_{IIn} < -0.8; \quad (3)$$

$$0.3 < |r_{IIn}/f_{II}| < 0.9; \quad (4)$$

$$\nu_{IIn} < 40; \quad (5)$$

wherein:

$f_{IIn}$ represents the focal length of said negative lens element within the second lens group;

$r_{IIn}$ represents the smallest radius of curvature of the concave surface(s) of the negative lens element within the second lens group; and $\nu_{IIn}$ represents the Abbe number of said negative lens element within the second lens group.

7. A real-image type optical finder according to claim 3, wherein said second lens group comprises a cemented lens having a positive lens element and a negative lens element and a single positive lens element.

8. A real-image type optical finder according to claim 7, wherein said negative lens element satisfies the following conditions (3) through (5):

$$-1.5 < f_{II}/f_{IIn} < -0.8; \quad (3)$$

$$0.3 < |r_{IIn}/f_{II}| < 0.9; \quad (4)$$

$$\nu_{IIn} < 40; \quad (5)$$

wherein:

$f_{IIn}$ represents the focal length of said negative lens element within the second lens group;

$r_{IIn}$ represents the smallest radius of curvature of the concave surface(s) of the negative lens element within the second lens group; and $\nu_{IIn}$ represents the Abbe number of said negative lens element within the second lens group.

9. A real-image type optical finder according to claim 1, wherein said third lens group comprises two positive lens elements wherein the convex surfaces face each other.

10. A real-image type optical finder according to claim 9, wherein said two positive lenses comprises meniscus lenses.

* * * * *